United States Patent [19]

Flagella

[11] Patent Number: 5,139,762
[45] Date of Patent: Aug. 18, 1992

[54] FLUIDIZED BED FOR PRODUCTION OF POLYCRYSTALLINE SILICON

[75] Inventor: Robert N. Flagella, Ridgefield, Wash.

[73] Assignee: Advanced Silicon Materials, Inc., Moses Lake, Wash.

[21] Appl. No.: 551,164

[22] Filed: Jul. 11, 1990

Related U.S. Application Data

[63] Continuation of Ser. No. 132,490, Dec. 14, 1987, abandoned.

[51] Int. Cl.$^5$ .............................................. C01B 33/02
[52] U.S. Cl. ................................... 423/349; 422/145; 422/147; 423/348; 427/213
[58] Field of Search ............... 423/348, 349; 427/213; 422/145, 147

[56] References Cited

U.S. PATENT DOCUMENTS

| | | | |
|---|---|---|---|
| 2,561,396 | 7/1951 | Matheson | 422/145 |
| 2,766,880 | 10/1956 | Schauh et al. | 209/138 |
| 2,915,790 | 12/1957 | Rice | 209/138 |
| 3,104,155 | 9/1963 | Lewis | 209/138 |
| 3,370,938 | 2/1968 | Newman et al. | 422/142 |
| 3,550,773 | 12/1970 | Villani et al. | 209/138 |
| 3,831,747 | 8/1974 | Scott et al. | 209/138 |
| 4,299,693 | 11/1981 | Paulsen | 209/138 |
| 4,299,694 | 11/1981 | Goode, II | 209/139.1 |
| 4,307,242 | 12/1981 | Shah et al. | 422/198 |
| 4,314,525 | 2/1982 | Hsu et al. | 422/198 |
| 4,314,899 | 2/1982 | Styring, Jr. | 209/138 |
| 4,416,913 | 11/1983 | Ingle et al. | 423/349 |
| 4,444,811 | 4/1984 | Hsu et al. | 423/349 |
| 4,684,513 | 8/1987 | Iya | 423/348 |
| 4,784,480 | 11/1988 | Gautreaux | 423/348 |
| 4,786,477 | 11/1988 | Yoon et al. | 422/146 |
| 4,868,013 | 9/1989 | Allen | 423/349 |
| 4,900,411 | 2/1990 | Poong et al. | 423/348 |

FOREIGN PATENT DOCUMENTS

| | | | |
|---|---|---|---|
| 0045917 | 3/1984 | Japan | 423/349 |
| 0005013 | 1/1985 | Japan | 423/348 |

OTHER PUBLICATIONS

McGraw Hill Dictionary of Scientific and Technical Terms, Fourth Edition, Sybil Parker–editor p. 635.
"Beds of Solids", Chemical Engineer's Handbook © 1973, pp. 5–52 to 5–53.
"Fbw Past Immersed Bodies", Unit Operations of Chemical Engineering, ©1976, pp. 163–169.

*Primary Examiner*—Olik Chaudhuri
*Assistant Examiner*—Ken Horton
*Attorney, Agent, or Firm*—Klarquist, Sparkman, Campbell, Leigh & Whinston

[57] ABSTRACT

An improved fluidized bed reactor and a method for utilizing the fluidized bed reactor in the production of, for example, high purity polycrystalline silicon, by the pyrolysis of silane containing gas. The reactor being characterized by an entrainment zone located above a lower reaction zone. The entrainment zone having a cross-sectional area less than or equal to the cross-sectional area of the reaction zone and being capable of maintaining a fluidization gas velocity sufficient to entrain silicon powder particles, yet not sufficient to entrain silicon particles.

9 Claims, 4 Drawing Sheets

FLUIDIZED BED FOR PRODUCTION OF POLYCRYSTALLINE SILICON

This application is a continuation of prior U.S. application Ser. No. 132,490 filed Dec. 14, 1987, now abandoned.

BACKGROUND OF THE INVENTION

The present invention relates to a fluidized bed reactor and, more particularly, to a fluidized bed reactor useful in a method for the production of high purity polycrystalline silicon.

The use of silicon for electronic applications requires the production of ultra-high purity silicon material. For use in semiconductors, it is common to require silicon material with impurity levels of less than 1 part per billion (ppb). Continuing advances in the electronics industry and the development of many new products in this field have led to an expanding market for ultra-high purity silicon. High purity silicon is also required for the fabrication of solar cell arrays for the direct conversion of sunlight to electricity. For all such applications, improvements in existing silicon technology are urgently needed to achieve enhanced silicon purity and quality at reduced costs. The production of high purity polycrystalline silicon on a continuous or semicontinuous basis by use of a fluidized bed reaction zone is an important aspect of the overall processing to produce ultra-high purity, single crystal silicon.

The production of polycrystalline silicon from silane and/or halosilane containing gases is accomplished by the pyrolysis of the silane containing gas to high purity silicon.

The pyrolysis step utilizes a fluid bed reactor zone wherein the silane containing gases are passed through a heated fluidized bed of silicon particles. Within this fluidized bed the silane is decomposed into high purity silicon and hydrogen gas by-product. The high purity silicon is deposited onto the silicon particles of the fluidized bed. The deposition of the silicon onto the silicon seed particles causes the particles to grow in size. The larger product particles of silicon are then removed from the fluidized bed by conventional means. Such production processes are disclosed in U.S. Pat. Nos. 3,979,490 to Dietz et al., 3,012,861 to Ling and 3,012,862 to Bertrand et al.

The decomposition of silane to silicon occurs both heterogeneously and homogeneously. The homogeneous decomposition results in the production of silicon powder of submicron and/or micron size. The silicon in powder form exhibits high surface areas and, therefore all the particles in the fluidized bed tend to grow much slower compared to the rate of growth when the powder particles are not present in the fluidized bed. As the process continues, the smaller particles begin to accumulate in the reactor as they are produced homogeneously. As the amount of silicon powder increases, the product size silicon particles are produced at a progressively slower rate because of the reduction in the number of silicon particles available for growth. As the pyrolysis continues, the bed begins to segregate, with the smaller particles at the top and the larger particles at the bottom. As the larger product particles are removed from the bottom of the reactor, only large particles are removed. As the removal of large particles continues, eventually the entire fluidized bed reactor will become essentially a bed of smaller silicon powder particles.

The presence of the silicon powder particles during the subsequent single crystal pulling technique is undesirable since the particles do not readily melt, but rather, float on the surface and disadvantageously deposit around the newly formed single crystal rod. Further, the silicon in powder form is more subject to contamination during production due to the increased surface area. Another problem exists in the difficulty of handling micron to sub-micron size particles of silicon powder.

The homogeneous decomposition of the silane may be retarded by decreasing the temperature at which the fluidized bed reaction zone is maintained. However, this suffers from the drawback that the efficiency of the heterogeneous decomposition is also adversely affected by a substantial decrease in the silane pyrolysis temperature. Another remedy requires maintaining a low concentration of silane and/or halosilane in the reaction zone in order to limit the homogeneous decomposition. However, this remedy suffers from the drawback that a low concentration of silane/halosilane may result in a low production rate of silicon. Therefore, the need exists for a fluidized bed reactor which may pyrolyze silane and/or halosilane gases at temperatures which result in the efficient heterogeneous decomposition of the silane gases and accommodates the silicon powder produced by homogeneous decomposition in the fluidized bed by removing the silicon powder from the bed before it accumulates and causes the silicon powder particles to be predominant in the fluidized bed.

Other objects, advantages and features of the present invention will be readily apparent from the following description of certain preferred embodiments thereof, taken in conjunction with the accompanying drawings. It is understood that variations and modifications may be effected without departing from the spirit and scope of the novel concepts of the disclosure.

SUMMARY OF THE INVENTION

The present invention relates to a fluidized bed reactor used for the production of high purity polycrystalline silicon by introducing a silane containing gas stream into a reaction zone of fluidized silicon particles. The silane containing gas is heterogeneously decomposed to silicon in the reaction zone, the resulting silicon depositing on the silicon particles. The deposition of the silicon onto the silicon particles enlarges the silicon particles and causes the enlarged silicon particles to segregate as silicon product particles near the bottom of the reaction zone in a collection zone. The present invention is directed to the utilization of an entrainment zone disposed above the reaction zone. The entrainment zone has a cross-sectional area perpendicular to the direction of the silane containing gas flow which is less than or equal to the cross-sectional area of the reaction zone perpendicular to the direction of the silane containing gas flow. The entrainment zone is characterized by a fluidizing gas velocity sufficient to entrain and remove a substantial amount of silicon powder particles produced by the homogeneous decomposition of the silane containing gas but not sufficient to entrain a significant amount of the silicon particles of the fluidized bed.

The present invention also relates to a method for producing high purity polycrystalline silicon by the pyrolysis of silane containing gas in a fluidized bed reaction zone of silicon particles. The method comprises the steps of introducing a silane containing gas stream into the reaction zone of fluidized silicon particles. The silane containing gas is heterogeneously decomposed under conditions whereby the silicon product of the heterogeneous decomposition deposits onto the silicon particles, causing the silicon particles to enlarge and segregate as silicon product particles in a collection zone. The silicon product particles are collected from the collection zone. The preferred embodiment of the invention is directed to the method of separating silicon powder particles produced by the homogeneous decomposition of the silane containing gas streams from the silicon particles of the fluidized bed by passing a fluidizing gas stream through an entrainment zone. The entrainment zone has a cross-sectional area perpendicular to the direction of the silane containing gas flow which is less than or equal to the cross-sectional area of the reaction zone perpendicular to the direction of the silane containing gas flow. The entrainment zone is characterized by a gas velocity sufficient to entrain and remove a substantial amount of the silicon powder particles but not sufficient to entrain a significant amount of the silicon particles.

Thus, the present invention provides an apparatus and an efficient means to remove, from the fluidized bed reaction zone by means of an entrainment zone, the silicon powder which is produced by the homogeneous decomposition of silane containing gas.

DETAILED DESCRIPTION OF THE INVENTION

As used herein, "heterogeneous decomposition" refers to the reduction of silane or a halosilane to silicon which occurs in two or more phases such as when the decomposition occurs at a boundary between a gas and a solid phase. This heterogeneous decomposition results in the deposition of silicon on either suspended silicon particles in the fluidized bed or on the internal surfaces of the fluidized bed reactor. "Homogenous decomposition" occurs in a single phase, such as the gas phase and produces high surface area silicon powder or dust in the micron to submicron size range. Generally, at a given temperature, the decomposition of silane containing gases will be either heterogeneous and/or homogenous, depending on the concentration of the silane containing gas. Generally, a low silane feed concentration is desirable to maintain the decomposition of the silane containing gas and halosilane to silicon in a heterogeneous mode. However, a very low feed concentration of silane containing gas may not provide a high production rate of silicon.

By the phrase "silicon seed particle" is meant those particles of the fluidized bed which range in size from about 50 microns to about 400 microns. Such particles desirably enlarge as silicon is deposited thereon to be eventually collected as silicon product particles. "Silicon product particles" are those seed particles which have enlarged to a size of at least about 400 microns, preferably ranging from about 400 microns to about 1300 microns. Such particles segregate near the bottom of the reaction zone and are collected in a collection zone, allowing for removal by conventional means. The term "silicon particle" refers to both the silicon seed particles and the silicon product particles of the fluidized bed.

The phrase "silicon powder" refers to generally micron to submicron, high surface area silicon particles resulting from the homogeneous decomposition of the silane and/or halosilane containing gas.

As used herein the term "silane containing gas" refers to both silane and/or halosilane containing gases unless otherwise indicated.

The term "fluidizing gas" or "fluidization gas" as used herein refers to the combination of silane containing gas and any other additional inert carrier gas which is added to the fluidized bed reactor to aid in the fluidization of the silicon particles.

Polycrystalline silicon may be prepared by introducing a flow of silane containing gas into a fluidized bed of silicon particles suspended in a reaction zone. These silicon particles are suspended by an upward flow of a fluidizing gas in the reaction zone. The fluidizing gas velocity through the reaction zone is maintained above the minimum fluidization velocity of the silicon particles. The temperature in the reaction zone is maintained within the decomposition temperature range of the silane containing gas and the melting point temperature of silicon. The silane containing gas is decomposed to form silicon which deposits on the surface of the silicon particles. As the silicon is deposited on the silicon particles, such particles enlarge and become segregated near the bottom of the fluidized bed in a collection zone disposed beneath the reaction zone. The collection zone may comprise any of the collection means known in the art for collecting particulate material. The product particles are removed from the collection zone by conventional means.

The silane containing gas may be introduced into the fluidized bed reaction zone from the bottom thereof in accordance with conventional practices. The silane containing gas may be introduced without dilution or the gas may be diluted with an inert carrier gas such as hydrogen, argon, helium, or the like. During the decomposition of silane, by-product hydrogen is produced and can be recycled for use as a carrier gas for additional quantities of silane feed gas in the semicontinuous or continuous operations of a fluidized bed.

Any suitable silane containing gas stream capable of being thermally pyrolized or reduced in the gas phase to silicon may be used as a feed gas to the fluidized bed. Illustrative of such gases are silane and the halosilanes of chlorine, bromine, fluorine and iodine. While the chlorosilanes, such as trichlorosilane, tetrachlorosilane, and dichlorosilane may be employed, particular advantages are realized through the use of silane. The slightly exothermic silane pyrolysis reaction goes substantially to completion, is irreversible, and is initiated at a somewhat lower temperature of about 200° C. compared to the pyrolysis temperature required for halosilane gases and the like. In addition, the silane and its decomposition products, i.e., silicon and hydrogen, are noncorrosive and non-polluting. In comparison, the chlorosilane decomposition is a reversible and incomplete reaction which results in the production of by-products which are corrosive in nature. Accordingly, silane is a preferred gas for use in the present invention, although other silane-containing gases may be utilized.

The silane feed gas streams and the inert carrier gas streams may be introduced into the reaction zone to form the fluidization gas stream by employing a conventional gas distributor below the reaction zone. The fluidization gas velocity through the reaction zone is generally maintained at a velocity of about one to eight times, preferably about two to about five times the minimum fluidization velocity necessary to fluidize the particles of average diameter within the fluidized bed. As used herein, the term "average diameter" means the summation of the quotients of a given particle diameter and the respective weight fraction attributed to the particles of the given diameter. Preferably, the fluidization gas velocity is about four times the minimum fluidization velocity for the silicon particles in the fluidized bed. The minimum fluidization velocity may be determined by conventional means known in the art, such as the equation:

$$\frac{1.75 D_p^2 \rho^2}{\phi_s \epsilon^3 \mu^2} \overline{V}_0^2 + \frac{150 D_p \rho (1-\epsilon)}{\phi_s^2 \epsilon^3 \mu} \overline{V}_0 - \frac{D_p^3 g \rho (\rho_p - \rho)}{\mu^2} = 0$$

wherein
$\overline{V}_0$ = minimum superficial gas velocity for fluidization (ft/s)
$D_p$ = average diameter of particles in the bed (ft)
$\rho$ = density of fluidization gas (lb/ft$^3$)
$\rho_p$ = density of particles (lb/ft$^3$)
$\phi_s$ = sphericity of particles
$\epsilon$ = void fraction in a bed of particles at minimum fluidization
$\mu$ = absolute viscosity of fluidizing gas (lb/ft-s)
$g$ = gravitational acceleration (ft/s$^2$).

The minimum fluidization velocity is a strong function of gas velocity and gas density, as well as average particle diameter, particle shape and void fraction. Thus, the minimum fluidization velocity may cover a wide range with small changes in these factors.

The minimum fluidization velocity is preferably calculated for conditions as they exist near the gas distributor. Using these conditions, which include temperatures that are normally cooler than the rest of the reaction zone, it is possible to ensure the minimum fluidization velocity calculated be sufficient to fluidize the entire bed. At the elevated temperatures of the reaction zone, the viscosity and density variables in the equation above are heat sensitive and may result in a minimum fluidization velocity that is not sufficient to fluidize the bed at the cooler temperatures of the lower portions of the bed. Therefore, by calculating a minimum fluidization velocity based on the cooler conditions, it is possible to ensure the calculation of the lowest fluidization gas velocity that will fluidize the entire bed. Although the present invention is not limited to specific minimum fluidization velocities, minimum fluidization velocities useful in the present invention range from about 0.4 ft/sec. to about 1.4 ft/sec., preferably 0.6 ft/sec. to about 1.2 ft/sec. and most preferably 0.9 ft/sec. to about 1.1 ft/sec.

Although the pyrolysis of silane increases the volume of gas in the reaction zone (1 mole of silane gas yields 2 moles of hydrogen gas), the volumetric increase in gas passing through the reaction zone may be at least in part compensated for by controlling the volumetric flow of input gases. Depending on the particular gas velocity required in the entrainment zone, the required volume of gas exiting the reaction zone may be determined. By taking into account the volume of additional gas generated in the pyrolysis reaction, it is possible to determine the desired volume of input gases required to achieve the desired volume leaving the reaction zone. As can be appreciated, the ratios of carrier gas to reaction gas in the input gases will have an effect on the total amount of by-product gas produced in the pyrolysis step. If less by-product gas is desired, the ratio of silane containing gas to inert gas can be lowered. If more by-product gas is desired, the ratio of silane containing gas to inert gas can be increased.

As discussed, the temperature in the reaction zone is maintained within the decomposition range of the silane containing gas and the melting point temperature of silicon. The lowest temperature at which the decomposition of silane occurs is about 200° C. The melting point temperature of silicon is about 1400° C. Therefore, it is preferred to operate the reaction zone at a temperature ranging from about 200° C. to about 1400° C., preferably from about 550° C. to about 1000° C. The heat that is used to maintain the reaction zone at such temperatures may be provided by conventional heating systems such as electrical resistance heaters disposed on the exterior of the reactor vessel wall.

The production of polycrystalline silicon in a fluidized bed reactor depends on supplying seed particles of silicon to the bed that have an average diameter ranging from about 50 microns to about 400 microns. These silicon seed particles form the substrates upon which the silicon derived from the heterogeneous decomposition of the silane is deposited. As the silane is decomposed and the silicon particles grow in size, the enlarged product particles having an average diameter of at least about 400 microns segregate near the bottom of the reaction zone in a collection zone. These enlarged particles preferably have an average diameter ranging from about 400 microns to about 1300 microns, and most preferably about 1000 microns. The silicon product particles are then collected and may be either continuously or periodically removed from the collection zone. The product particles are of sufficient size to be easily handled without any undue contamination of the high purity material.

In order to supply replenishing silicon seed particles for the fluidized bed, it is possible to divert a small fraction of the product material and suitably crush or grind this material into small, fine seed-sized particles. The seed-sized particles may then be reintroduced into the fluidized bed. Upon introduction, such small silicon seed particles become growth sites for silane decomposition as before and will gradually increase in size and be withdrawn from the bed as product particles.

In a fluidized bed reactor, the homogenous decomposition of silane containing gases that produces high surface area silicon powder is undesirable for several reasons. Most importantly, the high surface area of the undesirable silicon powder in the fluidized bed reactor decreases the rate at which all the silicon particles in the fluidized bed grow. As the amount of silicon powder in the fluidized bed increases, the rate of growth of the silicon particles decreases. As the pyrolysis continues, the bed begins to segregate with the smaller particles at the top and the larger particles at the bottom. As the larger particles are removed from the bottom of the reactor, only the large particles are removed. The amount of silicon particles within the fluidized bed becomes progressively smaller while the amount of silicon powder particles becomes more predominant. This has the effect of depleting the silicon particles, and eventually the entire fluidized bed reactor will become essentially a bed of smaller silicon powder particles. It follows therefore, that the removal of these silicon powder particles will aid in the operation of the production of high purity silicon from silane containing gases in the fluidized bed reactor.

In the practice of the present invention, it has been discovered that by placing an entrainment zone characterized by a particular gas velocity, above the fluidized bed reaction zone, a substantial portion of the silicon powder particles produced by the homogenous decomposition of silane can be removed from the fluidized bed reactor without removing a significant amount of the silicon particles present in the fluidized bed. The entrainment zone preferably has the same or a smaller cross-sectional area than the fluidized bed reaction zone. The velocity of the fluidizing gas passing through the entrainment zone must be such that for a given cross-sectional area of the entrainment zone the silicon powder particles are entrained and carried out the top of the reactor. Ideally, however, the fluidization gas velocity must not be so great as to cause carry-over loss of a significant quantity of the silicon particles of the fluidized bed. It has been found that generally, a fluidizing gas velocity through the entrainment zone suitable to achieve these goals ranges from about 0.1 ft/sec. to about 4.8 ft/sec.

Once a desired gas velocity through the entrainment zone is established, the particular dimensions of the entrainment zone may be determined by conventional means. For example, as the diameter of the entrainment zone is decreased, the gas velocity through the entrainment zone will increase for a given gas velocity through the reaction zone. Likewise, as the diameter of the entrainment zone is increased, the gas velocity through the entrainment zone will decrease for a given reaction zone gas velocity. Therefore, the diameter of the entrainment zone offers a variable that may be adjusted to attain the desired gas velocity through the entrainment zone.

The fluidized bed reactor constructed in accordance with this invention is generally a vertical vessel. While a cylindrical vessel and reaction zone are preferred, it is to be understood that any configurations that are acceptable to fluidized bed operations may be utilized. The particular dimensions of the reaction zone and reactor vessel will be primarily dependent upon the economics of design. The reaction zone cannot be too narrow or low output will result. Similarly, it cannot be too wide or heat transfer inefficiencies and bed fluidization difficulties will be encountered.

Figure 4:
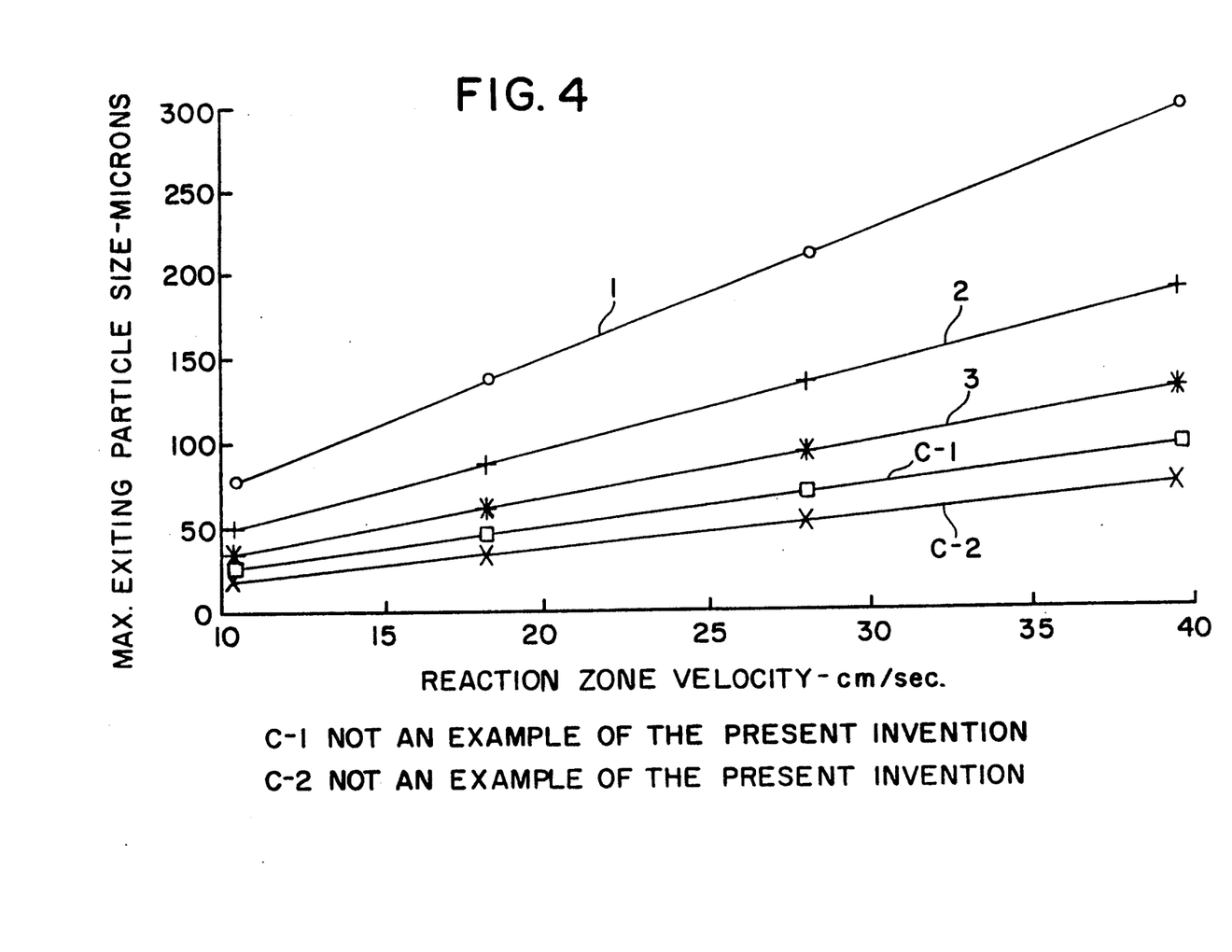
FIG. 4 illustrates the relationship of the gas velocity to the maximum size of the exiting particles.

As generally mentioned above, the diameter of the entrainment zone is dependent upon the desired fluidization velocity of the fluidizing gases flowing through the entrainment zone, as well as the size of the silicon powder particles desirably removed and the size of the silicon particles desirably retained. For a given fluidization gas velocity through the reaction zone, the relationship is illustrated in the graph of FIG. 4 for entrainment zones having a diameter less than or equal to the diameter of the reaction zone. Referring to the graph, line 1 shows the relationship between maximum exiting particle size and gas velocity in the reaction zone for an entrainment zone diameter of 20 cm. Line 2 shows the same relationship for an entrainment zone having a diameter of 25 cm, and line 3, the same for an entrainment zone diameter of 30 cm. These lines illustrate that as the diameter of the entrainment zone (lines 1, 2, and 3) increases, the maximum size of the exiting particles (y-axis) is reduced for a given fluidization gas velocity (x-axis). This results because the gas velocity through entrainment zones of increasing diameters is decreased for a given reaction zone flow rate.

Lines C-1 and C-2 illustrate an expanded head, which has been conventionally used in silane production, disposed above the reaction zone, that has a diameter larger than the diameter of the reaction zone and is not in accord with the present invention. Lines C-1 and C-2 are set forth only for comparison purposes. The expanded head generally results in a gas velocity that is insufficient to cause the silicon particles to be carried over. However, the expanded head also results in a gas velocity that is not sufficient to carry over a substantial portion of the silicon powder particles. In contrast, the entrainment zone of lines 1, 2 or 3 provides a gas velocity through the entrainment zone sufficient to remove a substantial portion of the silicon powder particles without carrying over a significant amount of silicon particles.

The entrainment of the silicon powder is also affected by the length of the entrainment zone. The length of the entrainment zone is again dependent on the fluidizing gas velocity, the entrainment zone diameter and the average particle size one desires to be entrained. The entrainment zone height for a given entrainment zone diameter may be determined by an equation such as:

$$E = 3.43(\mu_c/\mu_o)(V^2/gZ)^{1.42}$$

wherein
 $E$ = entrainment in lb. solids/lb. gas
 $\mu_c$ = viscosity of gas at operating conditions (lb/ft-s)
 $\mu_o$ -viscosity of air at 25° C. (lb/ft-s)
 $V$ = gas velocity (ft/s)
 $g$ = acceleration of gravity (ft/s$^2$)
 $Z$ = entrainment zone height (ft).

Preferably, for purposes of the invention, the length of the entrainment zone may range from about 2 feet to about 20 feet, most preferably from about 5 feet to about 10 feet.

The height of the entrainment zone is particularly important when the entrainment zone has a diameter that is equal to the diameter of the reaction zone. Because of the equivalent diameters, the gas velocities through the reaction zone ($V_1$) and entrainment zone ($V_2$) will be the same, unless an external gas source is supplied to the entrainment zone. The desired separation of silicon powder particles and silicon particles may be achieved by utilizing an entrainment zone that has a height sufficient to allow the fluidizing gas velocity to remove a substantial amount of the silicon powder particles without removing a significant amount of the larger silicon particles. If the entrainment zone is sufficiently high, the larger silicon particles lose their upward velocity and, thus, gravitate back into the fluidized bed reaction zone, while the smaller silicon powder particles are entrained and carried out the top of the entrainment zone due to the fluidizing gas velocity.

The gas velocities through the reaction zone ($V_1$) and the entrainment zone ($V_2$) must be chosen so that an efficient fluidized bed is maintained while an effective removal of silicon powder particles can be achieved. Therefore, the particular dimensions of the entrainment zone will vary depending on the silicon particle size, and the desired fluidization gas velocity through the reaction zone. By combining the variables relating to the height of the entrainment zone and the diameter of the entrainment zone it is possible to provide a gas velocity ($V_2$) that will entrain the silicon powder particles but not a significant amount of the larger silicon particles.

In a particular embodiment of the present invention, it is preferred that the planar cross-sectional area of the entrainment zone be less than a similar planar cross-sectional area taken through the reaction zone. In a typical cylindrical reaction zone, the reaction zone diameter may range up to about 12 inches. Therefore, the entrainment zone would preferably not be greater than 12 inches in diameter. More preferably, the entrainment zone diameter would range from about 7 up to about 10 inches and most preferably the entrainment zone diameter would be about 8 inches. It is to be understood, however, that the present invention is not to be limited to the following dimensions as long as the effect of removing silicon powder particles without carrying over a significant amount of silicon particles is achieved.

By the practice of the present invention, the skilled artisan may remove substantial amounts of silicon powder from the reaction zone of a fluidized bed used for the production of polycrystalline silicon from the pyrolysis of silane containing gas. Preferably, the present invention should allow for the removal of at least about 50 percent of the silicon powder produced by the homogeneous decomposition of silane containing gas. Most preferably, at least about 90 percent may be removed. Furthermore, the practice of the present invention should result in the entrainment loss of less than about 70 percent of the silicon particles of the fluidized bed, more preferably less than about 10 percent and most preferably less than about 1 percent.

Figure 1:
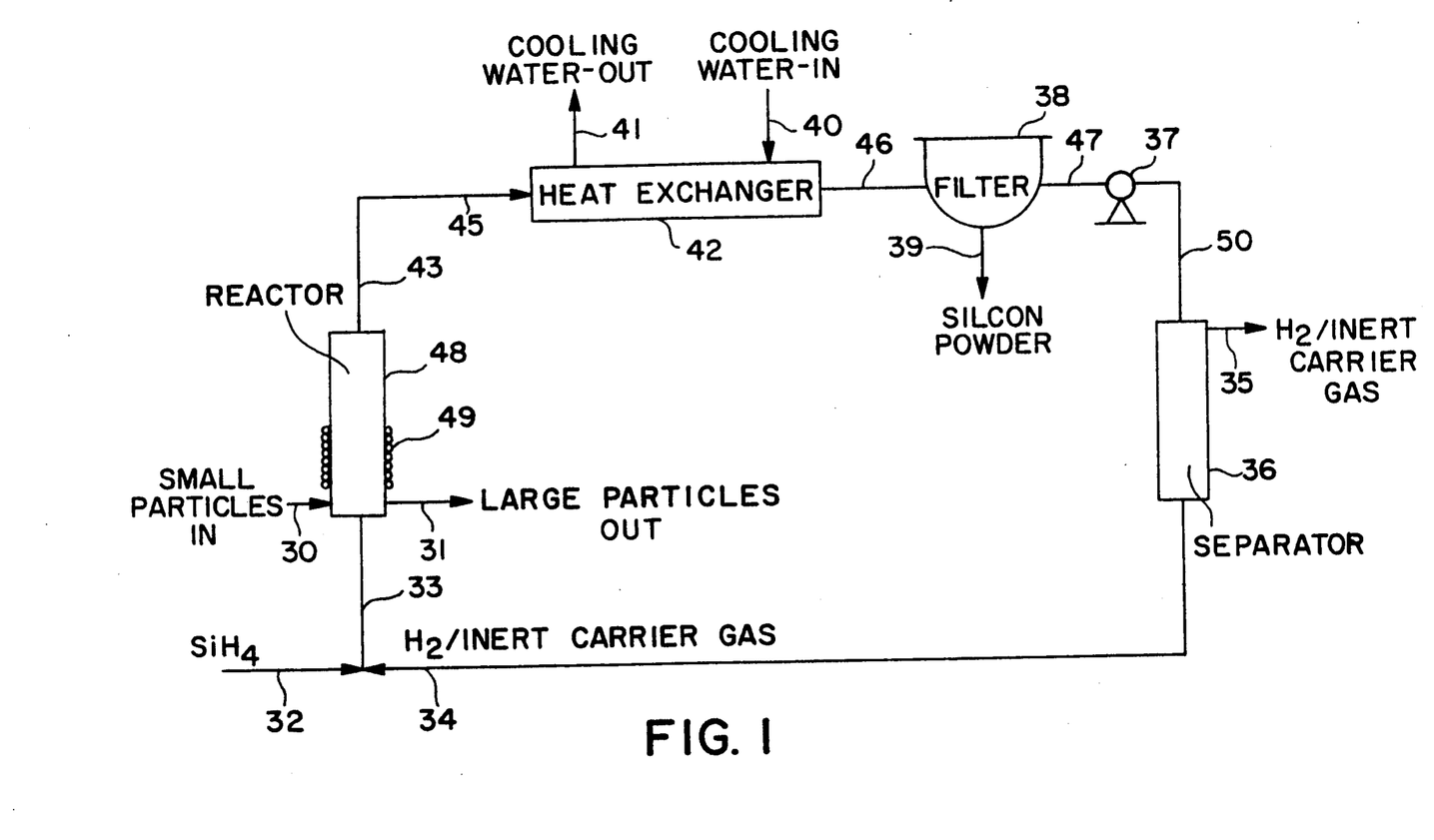
FIG. 1 illustrates schematically a flow diagram of a silicon production process using a fluidized bed reactor for the pyrolysis of silane containing gases.

Practical embodiments of the present invention will become more apparent from the following description when considered together with the accompanying drawings. This description is set forth as being illustrative of a preferred and alternate embodiment of the invention and is not intended in any way to be limitative thereof. Referring first to FIG. 1, the overall silane decomposition process in which the entrainment zone of the fluidized bed can be advantageously employed includes a reactor 48, heat exchanger 42, filter 38, compressor 37, and gas separator 36. The fluidized bed reactor 48 is heated by the heating means generally represented by 49. The silane feed stock material in line 32 is combined with the recycle hydrogen and/or inert carrier gas of line 34 to form the direct fluidization gas stream through line 33 into the bottom of the reactor 48. Silicon seed particles of conventional size are introduced into the reactor 48 through line 30. Said silicon seed particles are suspended as a fluidized bed within reactor 48 and agitated by the fluidization gas feed stream entering the reactor 48 through line 33. The silicon product particles resulting from the deposition of a silicon onto the silicon particles of the fluidized bed reactor 48 are removed from the reactor 48 near the bottom through line 31. Such product particles will conveniently be of a size and density suitable for direct handling without the further consolidation otherwise necessary in processes producing a fine silicon powder or dust in appreciable amounts.

As noted above, the use of silane as the silicon containing gas is advantageous in that silane and its decomposition products, i.e., silicon and hydrogen, are non-corrosive and nonpolluting. The by-product hydrogen generated upon decomposition of silane is removed from the reactor 48 through line 43 together with any inert carrier gas and excess silane introduced into the reactor 48 through line 33. The overhead gas in line 43 is recycled through line 45. The recycle hydrogen in line 45 may be used for the dilution of the silane containing gas feed in line 32 to be fed to the reactor 48 through line 33. If optional amounts of inert carrier gas are used in the present process it is possible that both hydrogen and the inert carrier gas will be present in lines 33, 43, 45, 46, 47, 50, 35, and 34.

The recycle gas stream 45 passes through a heat exchanger 42 for cooling therein in countercurrent flow with a coolant that enters the exchanger 42 through line 40 and exits therefrom through line 41. The recycle gas stream 45 is cooled to remove heat which may damage downstream equipment, as well as to prevent gas contamination from recycle process equipment. The recycle gas stream 45 is cooled to a temperature which will prevent the recycle gas 45 from causing the premature heterogeneous decomposition of the silane containing gas 32 when the two are mixed prior to entry into the reactor 48. The cooled gas recycle stream leaves exchanger 42 through line 46 and enters filter apparatus 38. The filter apparatus 38 is effective in removing from the cooled recycle gas stream 46 any silicon powder formed during the silane pyrolysis reaction. The filtered silicon powder exits the filter 38 through line 39. The filtered recycle gas stream exits the filter 38 through line 47 and is recompressed by means of compressor 37 to line 50. Line 50 then enters separator 36 wherein the recycle gas is separated into line 35 and line 34. Line 35 primarily contains hydrogen and trace amounts of other inert carrier gases. Such hydrogen may be utilized in other processes within the system. The recycle gas stream comprising hydrogen and other fluidizing gases in line 34 continues on to be combined with the silane feed stream line 32 to make up the fluidization gas feed stream line 33.

Figure 2:
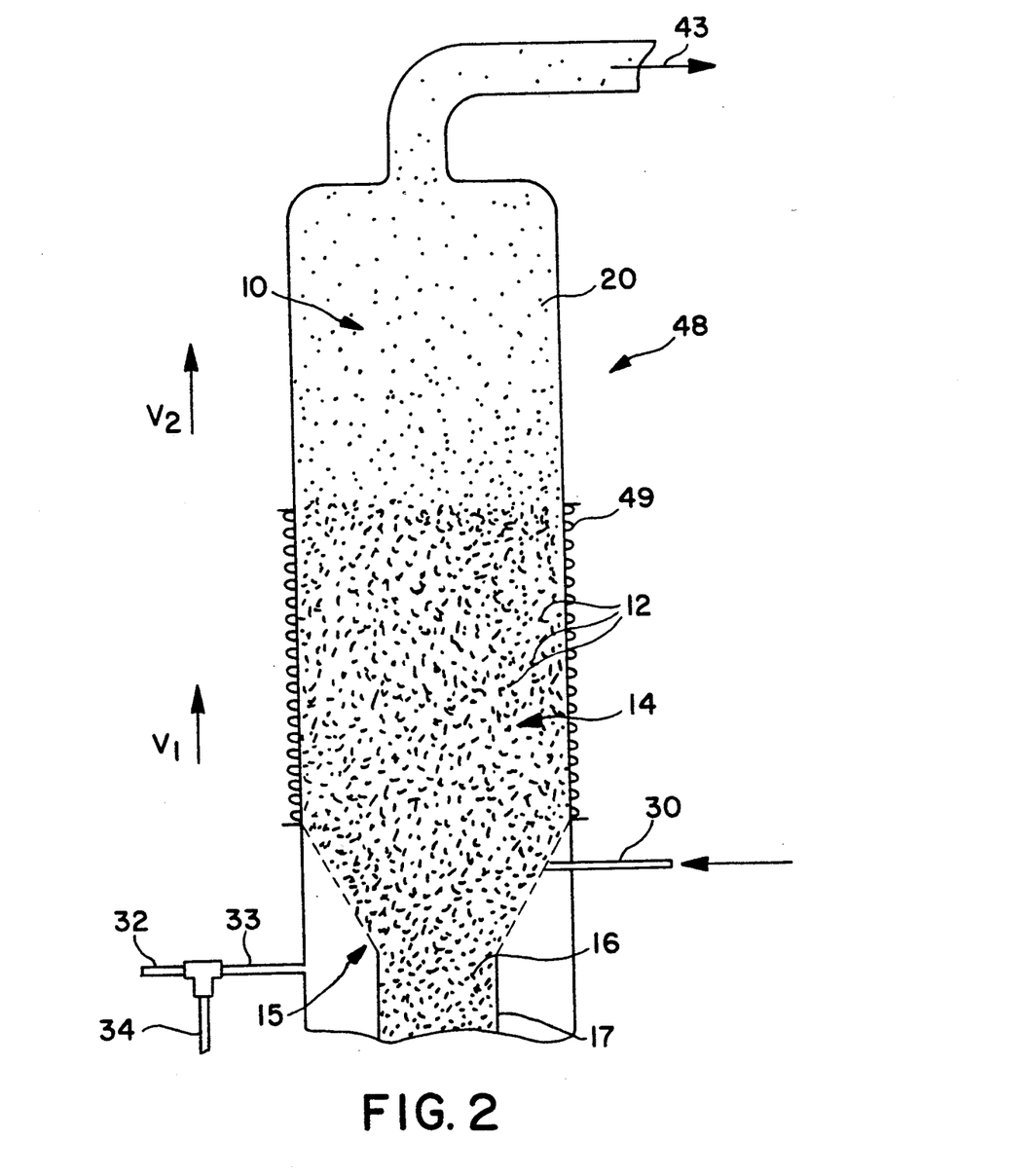
FIG. 2 illustrates a cross-sectional view of a particular embodiment of an apparatus in accordance with the present invention.

FIG. 2 is an embodiment of the present invention wherein the fluidization gas velocity $V_2$ through the entrainment zone 10 is equal to the fluidization gas velocity $V_1$ through the reaction zone 14. Silane feed gas in line 32 is combined with a hydrogen/inert carrier gas feed stream 34 to make up a feed stream in line 33 to the bottom of a reactor 48. The fluidization feed gas enters the fluidized bed reaction zone 14 through the perforations of a conventional gas distributor plate 15. The feed stream silane gas is decomposed within the fluidized bed 14 of silicon particles 12 to form silicon which is deposited onto the silicon particles 12 in the fluidized bed 14 to form enlarged silicon product particles 16. The enlarged silicon product particles 16 segregate near the bottom of the reactor 48 and are collected in a collection chamber 17. The collected product particles 16 are then removed from the collection chamber 17 by conventional means (not shown). The fluidized bed reactor 48 is characterized by a fluidization gas velocity sufficient to fluidize the silicon particles 12.

Figure 3:
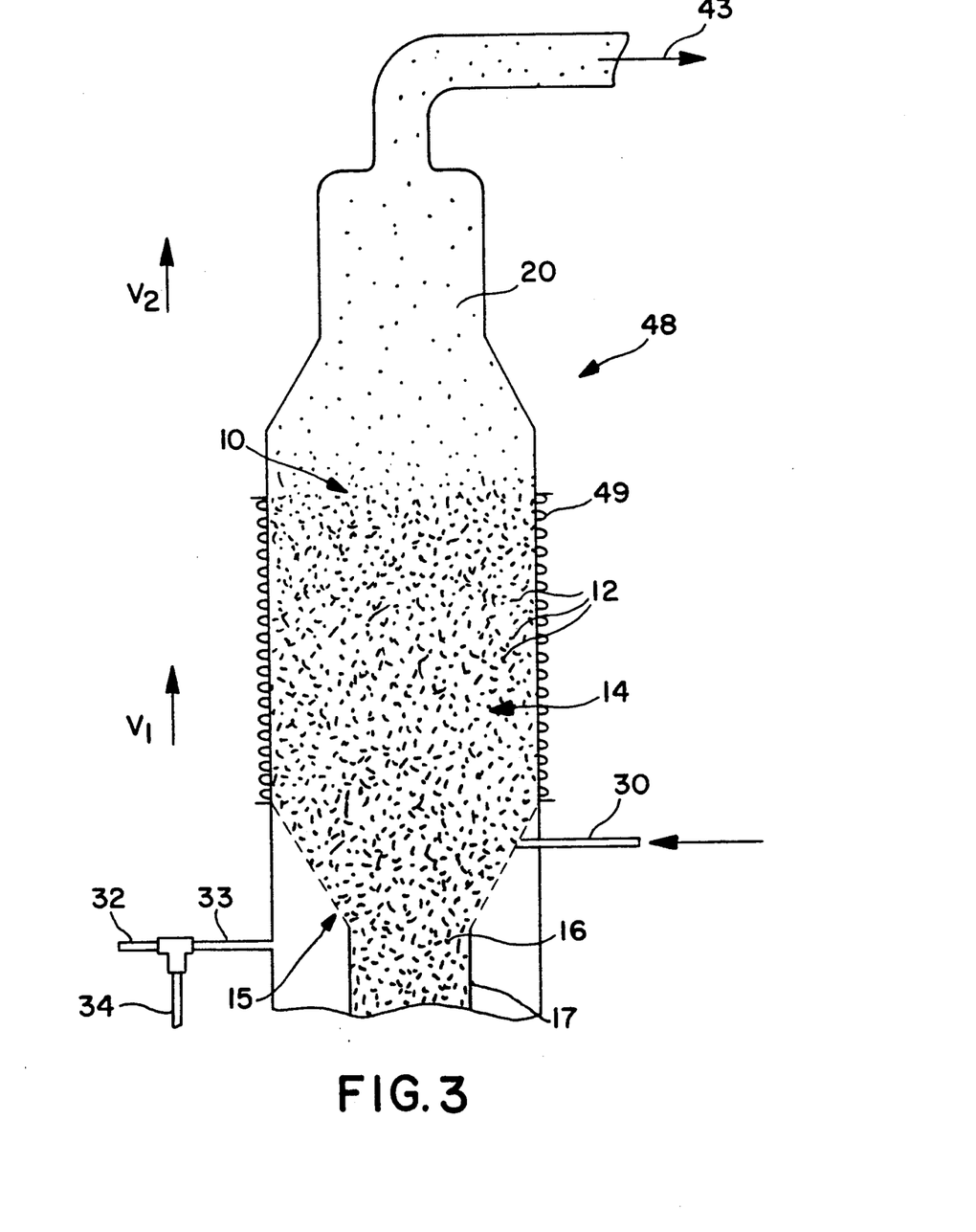
FIG. 3 illustrates another embodiment in accordance with the present invention.

Referring to FIGS. 2 and 3, a competing reaction with the heterogeneous decomposition of the silane feed in the reaction zone 14 is the homogeneous decomposition of the silane. The homogeneous decomposition results in the formation of silicon powder particles 20 which accumulate near the top of the reaction zone fluidized bed 14. It is necessary to remove these silicon powder particles 20 in order to maintain an efficient process for the production of silicon product particles 16. The smaller size of the silicon powder particles 20 allows the entrainment of such particles 20 with the upward fluidization gases as they pass through the entrainment zone 10 directly above the top of the fluidized bed reaction zone 14. The fluidization gas velocity through the entrainment zone 10 must be such that it does not cause the entrainment of the silicon particles 12. The by-product hydrogen gas, fluidization gases and silicon powder particles 20 exit through the upper portion of the entrainment zone 10 through outlet 43. The gas stream of 43 is further processed downstream to separate out individual gases and the silicon powder particles 20.

In the particular embodiment of FIG. 2, it is noted that the entrainment zone 10 and the reaction zone 14 are of the same diameter, therefore the fluidization gas velocity through the entrainment zone 10 and the reaction zone 14 are the same. By appropriately choosing the fluidization gas velocity, the desired separation of silicon powder particles 20 and silicon particles 12 is achieved by providing an entrainment zone 10 of proper height above the top of the fluidized bed reaction zone 14. For example, once the desired gas velocity has been chosen that will efficiently fluidize the bed of silicon particles 12, the gas velocity through the entrainment zone 10 is established. The height of the entrainment zone 10 situated directly above the top of the fluidized bed 14 is such that the fluidization gas velocity is sufficient to carry over a significant amount of silicon powder particles 20, but not sufficient to carry over a significant portion of silicon particles 12. If too many of the silicon particles 12 are being carried over, the height of the entrainment zone 10 should be increased. On the other hand, if not enough of the silicon powder particles 20 are removed, the height of the entrainment zone 10 should be reduced to a height that allows the removal of a desired amount of silicon powder particles 20 without removing a significant amount of the silicon particles 12.

Since the silicon seed particles of the fluidized bed 14 grow into silicon product particles 16 which are ultimately removed from the system, it is necessary to supply a replenishing source of silicon seed particles through line 30. The new seed particles are provided by grinding or milling the collected product particles 16. Heat is supplied to the fluidized bed reaction zone 14 by a suitable heating means 49, such as a resistance heater located on the exterior of the reaction vessel wall.

FIG. 3 is an embodiment of the present invention wherein the fluidization gas velocity $V_2$ through the entrainment zone 10 is greater than the fluidization gas velocity $V_1$ through the reaction zone 14. The higher velocity $V_2$ is achieved by using an entrainment zone 10 wherein the diameter of the entrainment zone 10 is less than the diameter of the reaction zone 14. For a given gas velocity $V_1$ through the reaction zone 14, it is possible to increase this velocity $V_1$ to $V_2$ through the entrainment zone 10 by using an entrainment zone 10 that has a diameter less than the diameter of the reaction zone 14. Such increased velocity $V_2$ is desirable in situations where the velocity $V_1$ is not sufficient to entrain the silicon powder particles 20.

The following example is intended to illustrate a particular embodiment of the present invention and is not intended to limit the scope of the disclosure in any way.

EXAMPLE

The reactor and process of this invention as depicted in the preceding Figures and Detailed Description is used to thermally decompose silane containing gas to silicon.

The fluidized bed reaction zone has a bed diameter of 30 centimeters. The bed contains silicon particles having an average diameter of about 1000 microns. Silane containing gas and fluidization gases are introduced into the bottom of the fluidized bed reaction zone through a conventional gas distributor. The feed gases enter the reaction zone at a temperature of about 25° C. and a pressure of about 30 psig. The feed stream includes 56 volume percent silane and 44 volume percent fluidization gases. The volumetric amount of feed gases entering the fluidized bed reaction zone is adjustable so that the gas velocity through the reaction zone may be adjusted also.

Situated above the fluidized bed reaction zone is an entrainment zone having a diameter of 30 centimeters. The entrainment zone has a height that is substantially equivalent to the height of the fluidized bed reaction zone. Feed gas that enters the bottom of the reaction zone, passes upward and through the reaction zone into the entrainment zone and out the top of the entrainment zone.

The gas velocity through the reaction zone is adjusted to be approximately 10, 15, 20, 25, 30, 35, and 40, centimeters per second. At each different reaction zone gas velocity the particles that are carried out the entrainment zone are collected. The collected particles are sized by conventional means, such as sieve trays, and the maximum exiting particle size is determined. For each reaction zone gas velocity the maximum exiting particle size is determined. The relationship is illustrated in FIG. 4 as line 3.

Additional measurements of maximum exiting particle size are conducted in the manner described above for entrainment zones having a diameter of 25 centimeters and 20 centimeters. The relationships for these entrainment zones is illustrated in FIG. 4 as lines 2 and 1, respectively.

For comparative purposes, an expanded head having a diameter of 35 cm and 40 cm, compared to a reaction zone diameter of 30 cm, is placed above the reaction zone. The maximum exiting particle size is determined as described above and the relationships are represented as lines C-1 and C-2 in FIG. 4. Lines C-1 and C-2 are for comparative purposes only and are not intended as examples of the present invention.

The information in FIG. 4 illustrates that for a given entrainment zone diameter, as the gas velocity through the reaction zone increases, the maximum size of the exiting particle also increases. Where the entrainment zone has a diameter less than or equivalent to the diameter of the reaction zone for a given reaction zone velocity (Lines 1-3), the maximum exiting particle size is larger than the maximum exiting particle size at the same reaction zone gas velocity where the entrainment zone is of a larger diameter than the reaction zone (Lines C-1 and C-2). This is a result of the increased gas velocity $V_2$ passing through the entrainment zone compared to the gas velocity through the expanded head. Therefore, the practice of the present invention, as illustrated by lines 1, 2 and 3 allows the maximum exiting particle size to be increased for a given reaction zone gas velocity compared to the maximum exiting particle size for an entrainment zone having a diameter larger than the reaction zone.

It is to be understood that modifications and changes in the preferred embodiment of the invention herein described and shown can be made without departing from the spirit and scope of the invention.

What is claimed is:

1. A method for removing silicon powder particles from a reactor that produces polycrystalline silicon by the pyrolysis of a silane containing gas in a fluidized bed reaction zone of silicon seed particles, the method comprising the steps of:
   (a) introducing the silane containing gas stream into the reaction zone of fluidized silicon seed particles;
   (b) heterogeneously decomposing the silane containing gas under conditions whereby the silicon heterogeneously decomposes onto the silicon seed particles causing the silicon seed particles to enlarge and segregate as silicon product particles in a collection zone;
   (c) collecting the silicon product particles from the collection zone; and
   (d) removing silicon powder particles from the reactor by separating silicon powder particles produced by the homogenous decomposition of the silane containing gas stream from the non-powder silicon particles by passing a fluidizing gas stream through an entrainment zone that extends from the reaction zone to an outlet and has a cross-sectional area perpendicular to the direction of the silane containing gas flow which is less than the cross-sectional area of the reaction zone perpendicular to the direction of the silane containing gas flow, said entrainment zone characterized by a gas velocity which entrains and removes at least 50 percent of the silicon powder particles through the outlet but does not entrain more than 10 percent of the non-powder silicon particles.

2. The method of claim 1, wherein the entrainment zone is sized to obtain a gas velocity effective in preventing entraining more than 10 percent of non-powder silicon particles of average diameter ranging from about 50 to about 400 microns.

3. The method of claim 1, wherein the entrainment zone is sized to obtain a gas velocity effective in preventing entrainment loss of more than 10 percent of non-powder silicon particles of greater than about 100 microns in size.

4. The method of claim 1, wherein the entrainment zone is sized to obtain a gas velocity effective in removing at least 50 percent of the silicon powder produced by the homogeneous decomposition of silane containing gas stream.

5. The method of claim 1, wherein the entrainment zone has a diameter ranging from about 7 inches to about 10 inches.

6. The method of claim 1, wherein the fluidizing gas flow through the entrainment zone ranges from about 0.1 ft/sec. to about 4.8 ft/sec.

7. A method for producing polycrystalline silicon by the pyrolysis of a silane containing gas in a fluidized bed reaction zone of silicon seed particles, comprising the steps of:
   (a) introducing a silane containing gas stream into the reaction zone of fluidized silicon seed particles ranging in diameter from about 50 microns to about 400 microns;
   (b) heterogeneously decomposing the silane containing gas at a temperature ranging from about 550° C. to about 1000° C., the silicon product of the heterogenous decomposition deposits onto the silicon seed particles causing the silicon seed particles to enlarge and segregate as silicon product particles ranging in average diameter from about 400 microns to about 1000 microns in a collection zone;
   (c) collecting the silicon product particles from the collection zone;
   (d) separating silicon powder particles ranging in average diameter up to about 1 micron, produced by the homogeneous decomposition of the silane containing gas stream, from the non-powder silicon particles by passing a fluidizing gas stream through an entrainment zone that extends from the reactor zone to an outlet, the entrainment zone having a cross-sectional area perpendicular to the direction of the silane containing gas flow which is less than the cross-sectional area of the reaction zone perpendicular to the direction of the silane containing gas flow, said entrainment zone characterized by a fluidization gas velocity ranging from about 0.1 ft/sec. to about 4.8 ft/sec., said fluidization gas velocity effective in removing through the outlet at least 50 percent of the silicon powder produced by the homogeneous decomposition of the silane containing gas stream, but which does not entrain more than 10 percent of non-powder silicon particles.

8. The method of claim 7, wherein the silane containing gas is silane.

9. The method of claim 7, wherein the entrainment loss of silicon particles of the fluidized bed is less than 70 percent of the silicon particles of the fluidized bed.

* * * * *